US012452755B2

(12) United States Patent
Polaganga et al.

(10) Patent No.: US 12,452,755 B2
(45) Date of Patent: Oct. 21, 2025

(54) SYSTEM AND METHODS FOR A DYNAMIC AND AUTONOMOUS NETWORK SWITCHING FOR A USER DEVICE

(71) Applicant: T-MOBILE INNOVATIONS LLC, Overland Park, KS (US)

(72) Inventors: Roopesh Kumar Polaganga, Bothell, WA (US); Madhav Ram Nusetty, Snohomish, WA (US); Ramesh Venkata Josyula, Redmond, WA (US); Meenakshi Dhar, Bellevue, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 416 days.

(21) Appl. No.: 18/072,036

(22) Filed: Nov. 30, 2022

(65) Prior Publication Data
US 2024/0179594 A1 May 30, 2024

(51) Int. Cl.
*H04W 36/14* (2009.01)
*H04W 36/30* (2009.01)
*H04W 36/32* (2009.01)

(52) U.S. Cl.
CPC ........... *H04W 36/14* (2013.01); *H04W 36/30* (2013.01); *H04W 36/32* (2013.01)

(58) Field of Classification Search
None
See application file for complete search history.

(56) References Cited

U.S. PATENT DOCUMENTS

| | | | |
|---|---|---|---|
| 2011/0195730 A1* | 8/2011 | Chami | H04W 52/244 455/501 |
| 2015/0312831 A1* | 10/2015 | Sang | H04W 36/0085 370/236 |
| 2015/0373603 A1* | 12/2015 | Jung | H04W 36/22 370/331 |
| 2017/0289890 A1* | 10/2017 | Jung | H04L 43/16 |
| 2018/0132143 A1* | 5/2018 | Sirotkin | H04W 36/0085 |
| 2018/0242193 A1* | 8/2018 | Teyeb | H04W 76/20 |
| 2018/0270742 A1* | 9/2018 | Bergström | H04W 48/18 |
| 2018/0376390 A1* | 12/2018 | Gemelos | H04W 36/0016 |

* cited by examiner

*Primary Examiner* — Kodzovi Acolatse
(74) *Attorney, Agent, or Firm* — SHOOK, HARDY & BACON L.L.P.; Elena McFarland (57) ABSTRACT

Aspects herein provide a system, media, and methods for dynamically switching a user device to a wireless connection as optimized for high uplink and/or downlink volume communications and/or low-latency needs associated with one or more applications, operations, and/or other functionalities, automatically and autonomously. In aspects, a user device is either directly connected to a telecommunications network via a base station and bypasses an in-range local network generated by a fixed wireless access point, or is connected to the local network generated by a fixed wireless access point instead of the telecommunications network. The connection selected and/or switched to is based on device capacity and signal characteristics.

20 Claims, 4 Drawing Sheets

SYSTEM AND METHODS FOR A DYNAMIC AND AUTONOMOUS NETWORK SWITCHING FOR A USER DEVICE

SUMMARY

A high-level overview of various aspects of the invention are provided here for that reason, to provide an overview of the disclosure and to introduce a selection of concepts that are further described below in the Detailed Description section. This summary is not intended to identify key features or essential features of the claimed subject matter, nor is it intended to be used as an aid in isolation to determine the scope of the claimed subject matter.

In one aspect, a computerized method is provided. In accordance with the method, it is determined that a physical location of a user device matches a physical location of a fixed wireless access point. Then, an uplink capacity of the user device and an uplink capacity of the fixed wireless access point are identified. It is then determined whether to select one of the user device or the fixed wireless access point based on a comparison of the uplink capacity of the user device and the uplink capacity of the fixed wireless access point. When the fixed wireless access point is selected as having the uplink capacity that is greater than the uplink capacity of the user device, an instruction is generated and communicated to the user device that causes the user device to directly connect to the fixed wireless access point. When the user device is selected as having the uplink capacity that is greater than the uplink capacity of the fixed wireless access point, additional actions are performed. It is determined whether the signal power and the signal quality of the user device meet or exceed a predefined threshold. When the signal power and the signal quality of the user device are determined to meet or exceed the predefined threshold, an instruction is generated and communicated to the user device that causes the user device to directly connect to the base station. When the signal power and the signal quality of the user device are determined to be less than the predefined threshold, an instruction is generated and communicated to the user device that causes the user device to directly connect to the fixed wireless access point.

In another aspect, one or more non-transitory computer-readable media are provided for storing instructions that when executed via one or more processors performs a computerized method. In aspects, it is determined that a physical location of a user device matches a physical location of a fixed wireless access point. Then, an uplink capacity of the user device and an uplink capacity of the fixed wireless access point are identified. It is then determined whether to select one of the user device or the fixed wireless access point based on a comparison of the uplink capacity of the user device and the uplink capacity of the fixed wireless access point. When the fixed wireless access point is selected as having the uplink capacity that is greater than the uplink capacity of the user device, an instruction is generated and communicated to the user device that causes the user device to directly connect to the fixed wireless access point. When the user device is selected as having the uplink capacity that is greater than the uplink capacity of the fixed wireless access point, additional actions are performed. It is determined whether the signal power and the signal quality of the user device meet or exceed a predefined threshold. When the signal power and the signal quality of the user device are determined to meet or exceed the predefined threshold, an instruction is generated and communicated to the user device that causes the user device to directly connect to the base station. When the signal power and the signal quality of the user device are determined to be less than the predefined threshold, an instruction is generated and communicated to the user device that causes the user device to directly connect to the fixed wireless access point.

In yet another aspect, a system is provided that comprises a base station. The base station is configured to determine that a physical location of a user device matches a physical location of a fixed wireless access point. Then, an uplink capacity of the user device and an uplink capacity of the fixed wireless access point are identified. It is then determined whether to select one of the user device or the fixed wireless access point based on a comparison of the uplink capacity of the user device and the uplink capacity of the fixed wireless access point. When the fixed wireless access point is selected as having the uplink capacity that is greater than the uplink capacity of the user device, an instruction is generated and communicated to the user device that causes the user device to directly connect to the fixed wireless access point. When the user device is selected as having the uplink capacity that is greater than the uplink capacity of the fixed wireless access point, the base is further configured to determine whether the signal power and the signal quality of the user device meet or exceed a predefined threshold. When the signal power and the signal quality of the user device are determined to meet or exceed the predefined threshold, an instruction is generated and communicated to the user device that causes the user device to directly connect to the base station. When the signal power and the signal quality of the user device are determined to be less than the predefined threshold, an instruction is generated and communicated to the user device that causes the user device to directly connect to the fixed wireless access point.

BRIEF DESCRIPTION OF THE DRAWINGS

Aspects are described in detail below with reference to the attached drawings, wherein.

DETAILED DESCRIPTION

The subject matter of the present invention is being described with specificity herein to meet statutory requirements. However, the Detailed Description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of the system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments and aspects set forth herein.

Throughout this disclosure, several acronyms and shorthand notations are used to aid in the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
 4G Fourth-Generation Wireless Access Technology
 5G Fifth-Generation Wireless Access Technology
 5GC Fifth-Generation Wireless Access Technology Core Network
 CDMA Code Division Multiple Access
 CD-ROM Compact Disk Read Only Memory
 CU Central unit
 DU Distribution unit
 DVD Digital Versatile Disc
 EEPROM Electrically Erasable Programmable Read-Only Memory
 eMBB Enhanced Mobile Broadband
 E-UTRAN Evolved Universal Mobile Telecommunications System
 FD-MIMO Full Dimension Multiple-Input Multiple-Output
 GIS Geographic/Geographical/Geospatial Information System
 GPRS General Packet Radio Service
 GSM Global System for Mobile Communications
 iDEN Integrated Digital Enhanced Network
 IIOT Industry Internet of Things
 IOT Internet of Things
 LED Light Emitting Diode
 LTE Long Term Evolution
 MD Mobile Device
 MEC Mobile Far Edge Computer
 MIMO Multiple-Input Multiple-Output
 mMIMO Massive Multiple-Input Multiple-Output
 mMTC Massive Machine Type Communication
 mmWave Millimeter Wave
 NEXRAD Next-Generation Radar
 NR New Radio
 PC Personal Computer
 PCS Personal Communications Service
 PDA Personal Digital Assistant
 PLMN Public Land Mobile Network
 RAM Random Access Memory
 RAN Radio Access Network
 RF Radio-Frequency
 ROM Read-Only Memory
 RRU Remote Radio Unit
 RU Radio Unit
 SON Self-Organizing Networks
 TDMA Time Division Multiple Access
 TXRU Transceiver
 UE User Equipment
 UMTS Universal Mobile Telecommunications System
 URLLC Ultra-Reliable Low Latency Communications
 UTRAN Universal Terrestrial Radio Access Network
 WCD Wireless Communication Device (interchangeable with UE)
 WLAN Wireless Local Area Network
 XR Extended Reality Further, various technical terms are used throughout this Detailed Description. An illustrative resource that fleshes out various aspects of these terms can be found in Newton's Telecom Dictionary, 25th Edition (2009).

Aspects herein may be embodied as, among other things: a method, system, or set of instructions embodied on one or more computer-readable media. Computer-readable media includes both volatile and nonvolatile media, removable and non-removable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Aspects may take the form of a hardware embodiment, or an embodiment combining software and hardware. Some aspects may take the form of a computer program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and non-volatile media, as well as removable and non-removable media, implemented in any method or technology for storage of information, such as computer-readable instructions, data structures, program modules, or other data. In this regard, computer storage media may include, but is not limited to, RAM, ROM, EEPROM, flash memory or other memory technology, CD-ROM, DVDs or other optical disk storage, magnetic cassettes, magnetic tape, magnetic disk storage, or other magnetic storage device, or any other medium which can be used to store the desired information and which may be accessed by the computing device 400 shown in FIG. 4.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage to one or more UE. For example, the network may include one or more, or a plurality of, wireless networks, hardwired networks, telecommunication networks, peer-to-peer networks, distributed networks, and/or any combination thereof. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various aspects. Examples of a network include a telecommunication network (e.g., 3G, 4G, 5G, CDMA, CDMA 1×A, GPRS, EVDO, TDMA, GSM, LTE, and/or LTE Advanced). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMax) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Globalnaya Navigazionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity (SOP)).

"Base station" and "cell site" may be used interchangeably herein to refer to a defined wireless communications coverage area (i.e., a geographic area) serviced by a base station. It will be understood that one base station may control one cell site or, alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

"Access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter. Access point refers to a device with complex software that is specifically configured to provide one or more user devices with a connection and/or access to a wireless network using, for example, an antenna, an antenna array, and/or one or more antenna elements. Examples of an access point include a cell tower, a cell site, a base station, a NodeB, an eNodeB, a gNodeB, a macro cell, a micro cell, a femtocell, a picocell, and/or a computing device capable of acting as a wireless "hotspot." The terms "cell site," "site," "base station," and "cell tower" are used interchangeably to reefer to macro cells for simplicity and thus, the terms should not be construed as limiting with regard to one another unless expressly designated as such in this Detailed Description. Examples of a cell site include macro cells such as a cell tower controlled by a gNodeB. Accordingly, the scale and coverage area of an access point is not limited to the examples discussed, and any size and shape of coverage area is contemplated to be within the scope of the invention. Because a cell tower and a base station controlling the cell tower may be remote from one another, or alternatively may be localized to each other, the term access point is not intended to be so limited as to require a cell tower and/or antenna. Generally, an access point, as discussed herein, is intended to refer to any device, whether local or remote to a physical location of a cell tower and/or antenna, having complex software that is specifically configured to provide one or more user devices with a connection and/or access to a wireless network. As used herein, a "fixed wireless access point" generally refers to a small cell for utilization within or around a structure such as a residence, wherein a home router device is just one example of a fixed wireless access point. In contrast, a "Base station" is generally used herein to refer to a macro cell device.

"User equipment," "UE," "mobile device," "user device," and "wireless communication device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In aspects, UE may take on any variety of devices, such as a personal computer, a laptop computer, a tablet, a netbook, a mobile phone, a smartphone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In aspects, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, mMIMO, 3G, 4G, 5G, and/or 802.11 protocols and techniques.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

At a high level, aspects discussed herein provide a system, methods, and media switching a user device between wireless connection(s) with a base station and a fixed wireless access point in order to optimize the service experience at the user device for high uplink and/or downlink volume communications and/or low-latency needs associated with one or more applications, operations, and/or other functionalities, automatically and autonomously. The system, methods, and media automatically and autonomously determine whether a user device should connect directly to a telecommunications network via a base station or whether the user device should connect to a local network generated by a fixed wireless access point, where the fixed wireless access point provides an indirect connection to the telecommunications network. The dynamic switching mechanism does not require user input to manually turn off Wi-Fi functionality of a user device, for example, as presently required by other technologies.

In this manner, the aspects herein provide an automatic and autonomous mechanism for dynamically switching a user device to an optimized wireless connection—either directly connecting to a telecommunications network via a base station and bypassing the in range local network generated by a fixed wireless access point, or connecting to the local network generated by a fixed wireless access point instead of the telecommunications network. By intelligently selecting a particular connection, it ensures that the service experience at the user device is optimized to handle "heavy" uplink and/or downlink applications, operations, and/or other functionalities. Rather than relying on a default preference to always switch to a Wi-Fi connection as is "backed into" user devices, the aspects herein include intelligent mechanisms, both network-based and user device-hosted, that evaluate and determine whether to utilize a local network or to make a direct connection to a telecommunication network based on the capabilities and other factors of the user device and a fixed wireless access point that generates the local network. Additionally, aspects evaluate and determine whether to utilize a local network or to make a direct connection to a telecommunication network based on one or more applications running on the user device, including the uplink and/or downlink resources anticipated or expected to be used for those one or more applications.

Figure 1:
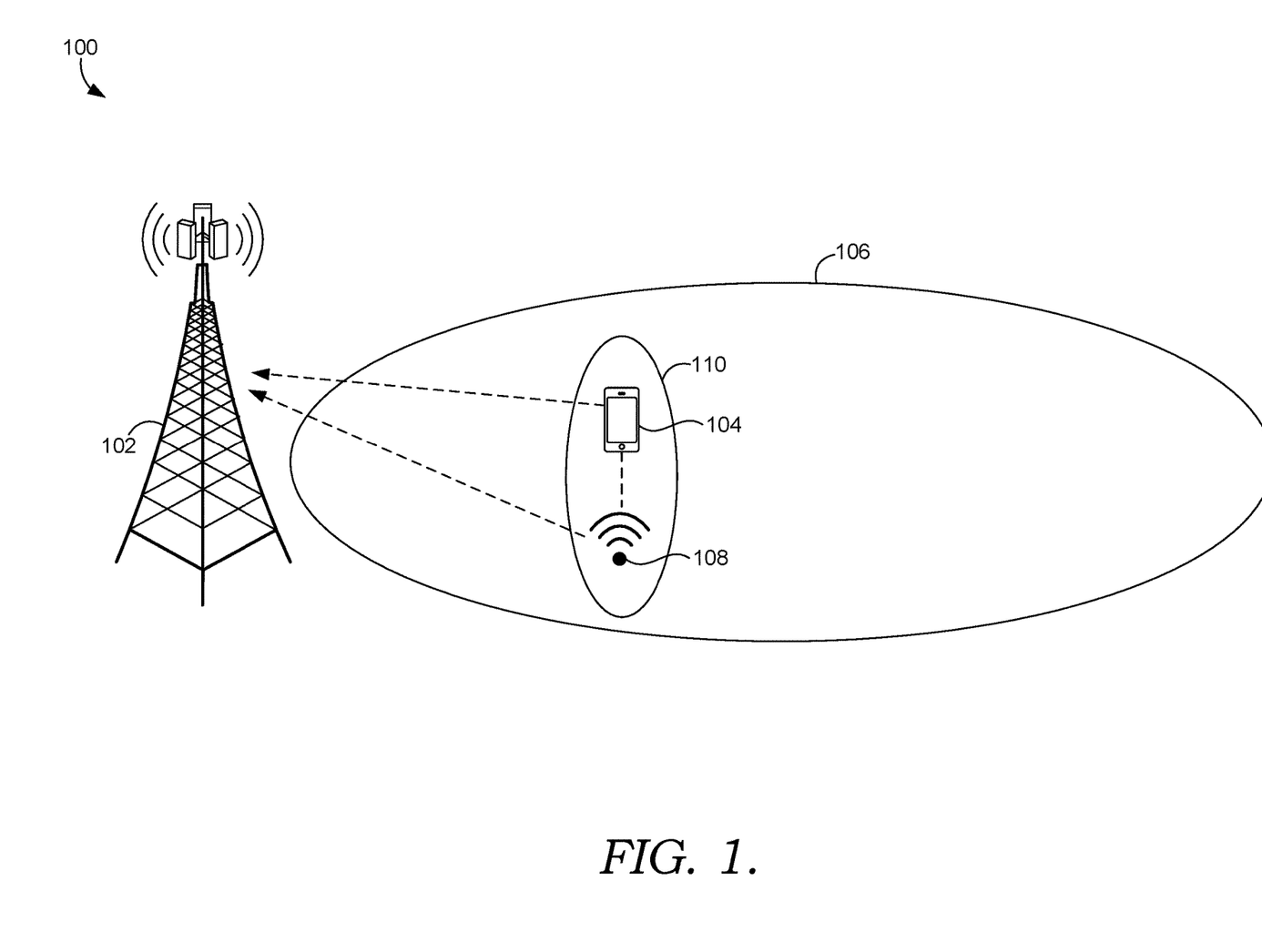
FIG. 1 depicts an example of a system in accordance with one or more embodiments.

Beginning with FIG. 1, a system 100 is provided. In aspects, the system 100 includes a base station 102 that can provide a user device 104 with a wireless connection to a telecommunications network that are in the coverage area 106 created by one or more antenna of the base station 102. In various aspects, the base station 102 can provide a small cell, such as the fixed wireless access point 108, a wireless connection to the telecommunications network as the small cell is within the coverage area 106 created by one or more antenna of the base station 102. The fixed wireless access point 108 may be associated with a residential location and/or a particular user account in various aspects. An example of a fixed wireless access point is a residential-type router device that provides the user device 104 with access to a local network, such as Wi-Fi, with a corresponding coverage area 110 for the fixed wireless access point 108. As such, the fixed wireless access point is a small cell device, whereas a base station is a macro cell.

In aspects, the base station 102 is configured to determine whether a physical location of a user device 104 matches a physical location of a fixed wireless access point 108. The physical locations of the user device 104 and the fixed wireless access point 108 can be determined to be a "match" when both devices are within the coverage area 106 of the same base station 102 and when the user device 104 is concurrently within the coverage area 110 of the fixed wireless access point 108. This determination that the physical locations are a "match" generally refers to the two devices being within a defined threshold distance of one another, and/or within short-range communications distances of one another (e.g., Wi-Fi, Bluetooth®, Near Field Communication), for example.

The base station 102 identifies an uplink capacity of the user device 104 and an uplink capacity of the fixed wireless access point 108. Additionally or alternatively, the base station 102 identifies a downlink capacity of the user device 104 and a downlink capacity of the fixed wireless access point 108. For example, the base station 102 may receive a wireless electronic communication from each of the user device 104 and the fixed wireless access point 108 through the telecommunication network, wherein each wireless electronic communication includes a measured value that defines the uplink speed available to the corresponding device. As such, the term "uplink capacity" refers to the theoretical upward value or maximum value of uplink speed that the device is capable of achieving in optimized or optimal conditions. For example, the user device 104 may report an uplink capacity that indicates the user device can operate with uplink speeds of 2 Gigabits per second (Gbps), whereas the fixed wireless access point 108 may report an uplink capacity indicating that the fixed wireless access point 108 can operate with uplink speeds of 1 Gbps. Conversely, the term "downlink capacity" refers to the theoretical upward value or maximum value of downlink speed that the device is capable of achieving in optimized or optimal conditions. It will be understood that while uplink characteristics are discussed throughout, downlink characteristics are contemplated to be within the scope of the invention and utilized by the system and methods herein to achieve the same or similar steps/performed actions discussed with regard to the uplink.

The base station 102 determines whether to select one of the user device or the fixed wireless access point based on a comparison of the uplink and/or downlink capacity of the user device 104 and the uplink and/or downlink capacity of the fixed wireless access point 108. In aspects, when the user device 104 has a greater uplink and/or downlink capacity than the fixed wireless access point 108, the base station 102 selects the user device 104 for forming a direct wireless connection to the base station 102, as further discussed herein. Conversely, when the user device 104 has a lower uplink and/or downlink capacity than the fixed wireless access point 108, the base station 102 selects the fixed wireless access point 108 for connecting the user device 104 to the local network. In this manner, the fixed wireless access point 108 serves as an intermediary device that connects the user device to the base station 102 through the local network (see coverage area 106) generated by the fixed wireless access point 108. As such, in various aspects, the base station 102 determines, identifies, or otherwise selects the device having the greatest relative uplink and/or downlink capacity.

When the fixed wireless access point 108 is selected as having an uplink and/or downlink capacity that is greater than the uplink and/or downlink capacity of the user device, the base station 102 generates and communicates an instruction to the user device that causes the user device to directly connect to the fixed wireless access point 108. As the fixed wireless access point 108 has a greater relative uplink and/or downlink capacity, the base station 102 instructs the user device 104 to connect to the local network of the fixed wireless access point 108, i.e., instructs the user device 104 not to directly connect to the base station 102 over the telecommunication network, such that the fixed wireless access point 108 indirectly connects the user device 104 to base station 102.

In aspects where the user device is selected as having an uplink and/or downlink capacity that is greater than the uplink and/or downlink capacity of the fixed wireless access point, the base station 102 continues by determining whether the signal power and/or the signal quality of the user device 104 meet or exceed a predefined threshold. Although the user device 104 is determined as having a greater uplink and/or downlink capacity, in this example, such that the user device 104 is a candidate for a direct wireless connection to the base station 102, the base station 102 evaluates whether the signal power and/or the signal quality of the user device 104 is adequate or sufficient to ensure that such a direct wireless connection will be optimized or optimal in providing service to the user device 104. When the signal power and/or the signal quality of the user device are determined to meet or exceed the predefined threshold(s), the base station 102 generates and communicates an instruction to the user device 104 that causes the user device to directly connect to the base station. Thus, because the signal power and/or the signal quality indicates that the user device 104 is not experiencing degraded or impaired operations, the user device 104 can be directly and wirelessly connected to the base station 102, forgoing a connection to the fixed wireless access point 108. The instruction can be a computer-readable and computer-executable instruction that causes the user device 104 to automatically, and without manual or user intervention/action, directly connect to the base station 102 over the telecommunications network, rather than connecting to the fixed wireless access point 108 over its local network.

In other aspects however, when the signal power and/or the signal quality of the user device are determined to be less than the predefined threshold, the base station 102 generates and communicates the instruction to the user device 104 that causes the user device 104 to directly connect to the fixed wireless access point. Because the signal power and/or the signal quality indicates that the user device 104 is experiencing degraded or impaired operations, the base station 102 determines that the user device 104 is not a candidate for a direct wireless connection to the base station 102. Thus, the instruction pushes the user device 104 to connect to the local network provided by the fixed wireless access point 108, i.e., instructs the user device 104 to connect to the fixed wireless access point 108 and not to directly wirelessly connect to the base station 102 over the telecommunication network.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing a communication link(s) between the components shown in FIG. 1 may be utilized in implementations of the present invention. It will be understood to those of ordinary skill in the art that the components may be connected in various manners, hardwired or wireless, and may use intermediary components that have been omitted or are not included in FIG. 1 for simplicity's sake. As such, the absence of components from FIG. 1 should not be interpreted as limiting the present invention to exclude additional components and combination(s) of components. Moreover, though components are represented in FIG. 1 as singular components, it will be appreciated that some aspects may include a plurality of devices and/or components such that FIG. 1 should not be considered as limiting the number of a device or component.

Figure 2:
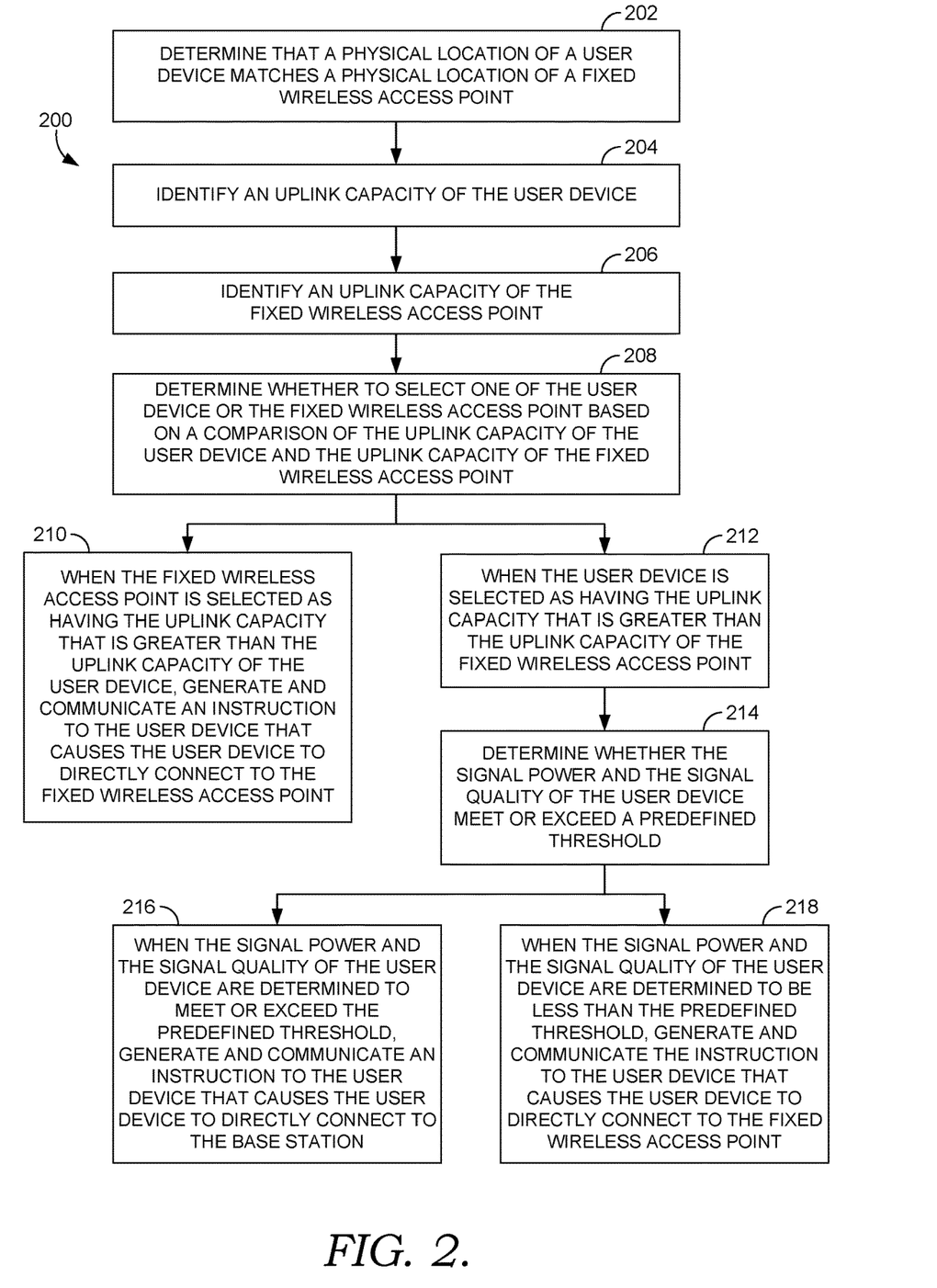
FIG. 2 depicts a flowchart of a method in accordance with one or more embodiments.

FIG. 2 provides a method 200 for performance by a base station. In some aspects, the method 200 can be a computer-implemented method that is performed automatically and without requiring user input and/or user interaction. In an aspect, one or more non-transitory computer-readable storage media having computer-readable instructions or computer-readable program code portions embodied thereon, for execution via one or more processors, can be used to implement and/or perform the method 200. For example, computer-readable instructions or computer-readable program code portions can specify the performance of the method 200, can specify a sequence of steps of the method 200, and/or can identify particular component(s) of software and/or hardware for performing one or more of the steps of the method 200. The computer-readable instructions or computer-readable program code portions can correspond to an application and/or an application programming interface (API), in some aspects. In one aspect, the application or API can implement and/or perform the method 200. As discussed below, the method 200 can be performed using software, hardware, component(s), and/or device(s) depicted in the example of FIG. 1, such as the base station 102. As such, one or more of the steps or actions discussed may be the same, similar, and/or overlap with previously described actions discussed in the context of FIG. 1. In aspects, the method 200 can be performed on a per device basis, such that each of a plurality of user devices can be individually evaluated by a base station. In aspects, the method 200 may be triggered automatically for each instance a user device being detected within range of a fixed wireless access point, whether that detection is by a base station or a wireless access point, for example. It will be understood that while the methods discussed herein reference uplink characteristics, the method 200 can be performed with consideration of downlink characteristics, alone or in combination with uplink characteristics, such that embodiment(s) of the method 200 that rely on the downlink characteristics are contemplated to be within the scope of the invention.

At block 202, it is determined that a physical location of a user device matches a physical location of a fixed wireless access point. For example, the user device and fixed wireless access point may be determined to be co-located when it is determined that the physical location of the user device is within a coverage area of a Wi-Fi network provided by the fixed wireless access point, when it is determined that the user device is connected to the Wi-Fi network provided by the fixed wireless access point, or a combination thereof.

At block 204, an uplink capacity of the user device is identified. At block 206, an uplink capacity of the fixed wireless access point is identified. Then, at block 208, it is determined whether to select one of the user device or the fixed wireless access point based on a comparison of the uplink capacity of the user device and the uplink capacity of the fixed wireless access point. For example, one device having the greater uplink capacity relative to the other device may be identified and selected for further evaluation or selection for wirelessly connecting the user device to a local network or to a telecommunications network.

When the fixed wireless access point is selected as having the uplink capacity that is greater than the uplink capacity of the user device, at block 210, an instruction is generated and communicated to the user device that causes the user device to directly connect to the fixed wireless access point. For example, the instruction that causes the user device to directly connect to the fixed wireless access point may include one or more rules for connecting to a Wi-Fi network, the one or more rules being provided using access network discovery and selection function (ANDSF). In such an example, the user device can use the ANDSF to connect to a local network, such as a Wi-Fi network, that is generated by the fixed wireless access point, thus wirelessly connecting the user device to the fixed wireless access point.

However, when the user device is selected as having the uplink capacity that is greater than the uplink capacity of the fixed wireless access point, the method 200 includes additional steps, beginning at block 212. At block 214, it is determined whether the signal power and the signal quality of the user device meet or exceed a predefined threshold. The predefined threshold can define a minimum value for Reference Signal Received Power (RSRP), Reference Signal Received Quality (RSRQ), or both, in various aspects. In some instances, a plurality of thresholds are employed: for example, one threshold may define a value or value range for RSRP whereas another threshold may define a value or value range for RSRQ.

When the signal power and the signal quality of the user device are determined to meet or exceed the predefined threshold(s), an instruction is generated and communicated to the user device that causes the user device to directly connect to the base station, at block 216. The instruction to the user device that causes the user device to directly connect to the base station may include an instruction that causes the user device to automatically switch from a Wi-Fi network to a direct wireless connection to the base station over a telecommunication network, independent of whether the Wi-Fi connectivity of the user device continues to operate in the background. In various aspects, the instruction to the user device that causes the user device to directly connect to the base station includes an instruction that automatically turns off Wi-Fi connectivity operations at the user device, without requiring user intervention. The instruction to the user device that causes the user device to directly connect to the base station can, in various aspects, include one or more rules for connecting to the telecommunications network (directly through the base station) based on one or more currently running applications of the user device associated with increased uplink resource usage.

However, when the signal power and the signal quality of the user device are determined to be less than the predefined threshold, an instruction is generated and communicated to the user device that causes the user device to directly connect to the fixed wireless access point, shown at block 218. Accordingly, even though the uplink capacity of the user device is greater than the fixed wireless access point such that the user device was potentially a candidate for a direct connection to the base station, the signal power and/or the signal quality are impaired enough (per the predefined threshold) such that the user device is not an optimal a candidate for a direct connection to the base station. Rather, the fixed wireless access point is to provide a connection to the user device over a local network. In aspects, the instruction to the user device that causes the user device to directly connect to the fixed wireless access point may include one or more rules for connecting to a Wi-Fi network, the one or more rules being provided using an ANDSF. The instruction to the user device that causes the user device to directly connect to the fixed wireless access point can, in various aspects, include one or more rules for connecting to a Wi-Fi network based on one or more currently running applications of the user device being associated with decreased uplink resource usage.

Figure 3:
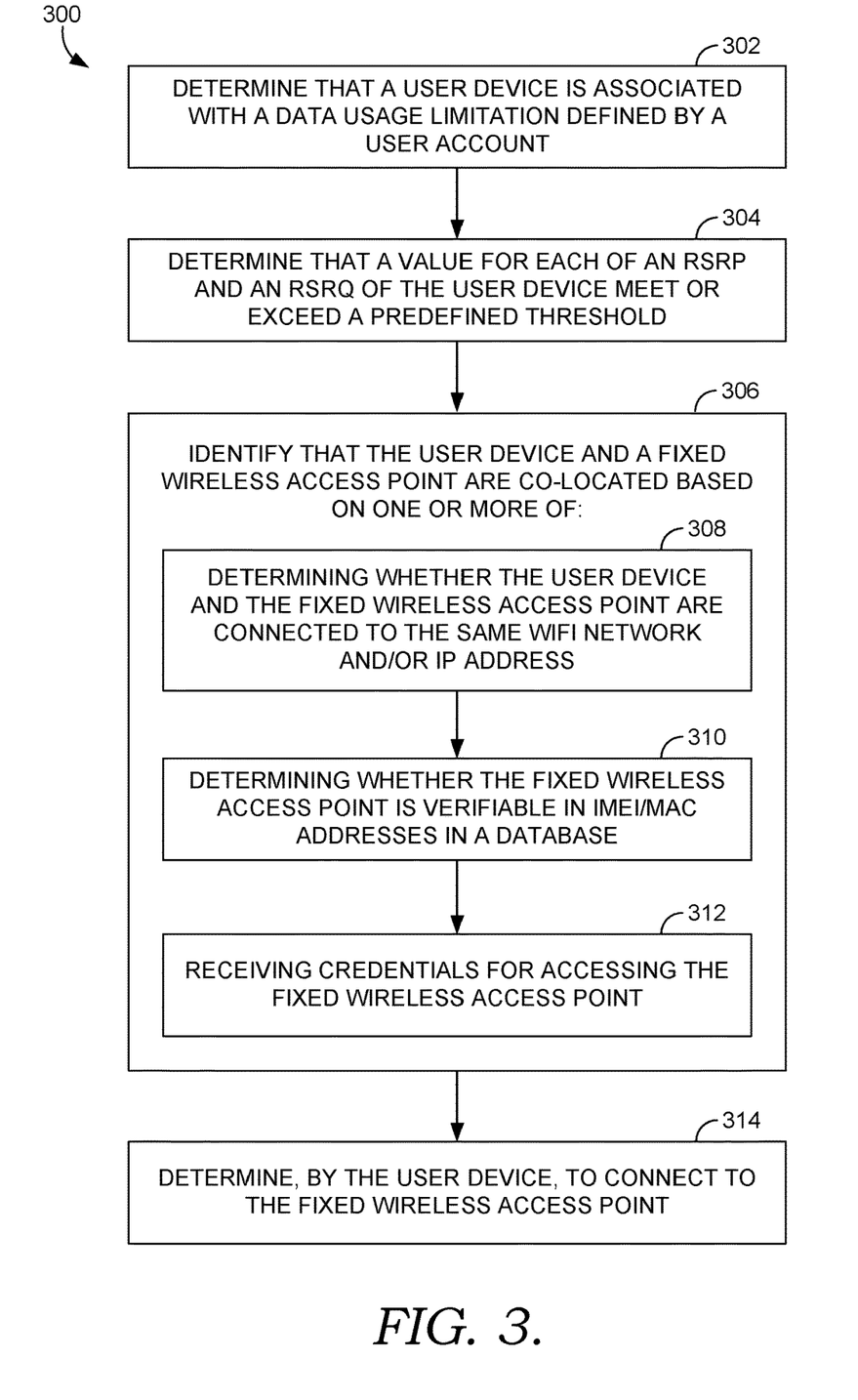
FIG. 3 depicts a flowchart of another method in accordance with one or more embodiments.

Turning to FIG. 3, it provides a method 300 for performance by a user device. In some aspects, the method 300 can be a computer-implemented method that is performed automatically and without requiring user input and/or user interaction. In one aspect, one or more non-transitory computer-readable storage media having computer-readable instructions or computer-readable program code portions embodied thereon, for execution via one or more processors, can be used to implement and/or perform the method 300. For example, computer-readable instructions or computer-readable program code portions can specify the performance of the method 200, can specify a sequence of steps of the method 300, and/or can identify particular component(s) of software and/or hardware for performing one or more of the steps of the method 300. The computer-readable instructions or computer-readable program code portions can correspond to an application and/or an application programming interface (API), in some aspects. In one aspect, the application or API can implement and/or perform the method 300. As discussed below, the method 300 can be performed using software, hardware, component(s), and/or device(s) depicted in the example of FIG. 1, such as the user device 104. As such, one or more of the steps or actions discussed may be the same, similar, and/or overlap with previously described actions discussed in the context of FIG. 1.

At block 302, it is determined that a user device is associated with a data usage limitation defined by a user account. This association may be determined by a user device itself. For example, the user device may access account information for a particular user account with a carrier, and may determine that the particular account defines a data usage limitation allowed for a specific period of time (e.g., 5 GB of data per month) for one or more user devices, such as the user device. At block 304, it is determined that a value for each of an RSRP and an RSRQ of the user device meet or exceed a predefined threshold. At block 306, the user device and a fixed wireless access point are identified as being co-located with each other. The co-location of the two devices can based on determining whether the user device and the fixed wireless access point are connected to the same Wi-Fi network and/or IP address, shown at block 308. Additionally or alternatively, the co-location of the two devices can based on determining whether the fixed wireless access point is verifiable in IMEI/MAC addresses in a database, shown at block 310. For example, the fixed wireless access point may provide an IMEI/MAC address to the user device, which the user device can use to query a database that stores records for identifying verified or "trusted" devices. At block 312, credentials for accessing the fixed wireless access point are received, for example, by a user device, based on a determination that the fixed wireless access point is a trusted/verified device. Credentials may include a login name, a password, a code, a token, or other electronic security techniques. At block 314, the user device determines to connect itself to the fixed wireless access point, for example, utilizing the credentials received.

Figure 4:
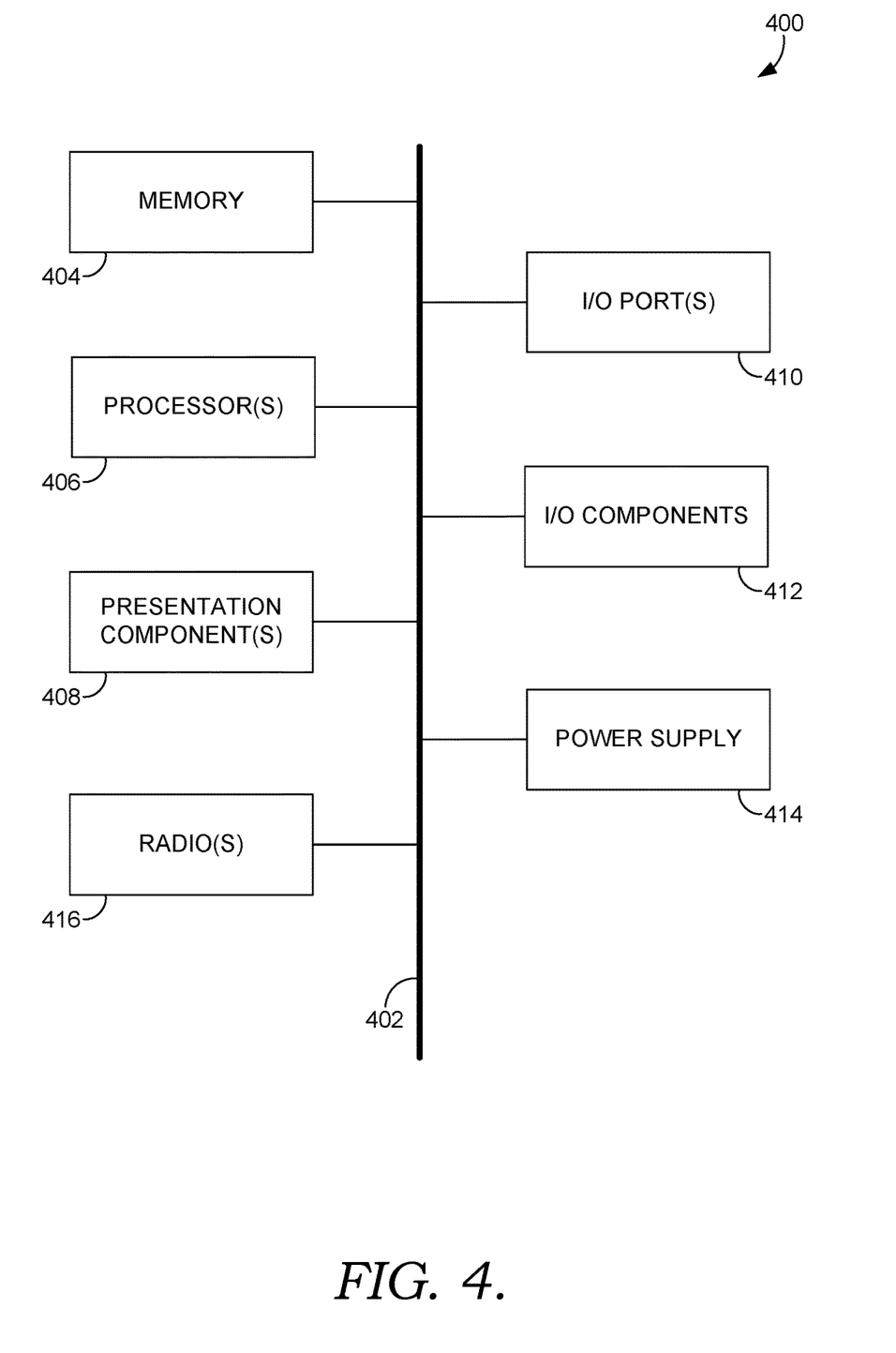
FIG. 4 illustrates an example computing device suitable for use in implementations of the present disclosure.

Turning now to FIG. 4, a diagram is depicted of an example computing device 400 suitable for use in implementations of the present disclosure. Computing device 400 is but one example of a suitable computing environment and is not intended to suggest any limitation as to the scope of use or functionality of the invention. Neither should computing device 400 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 4, computing device 400 includes bus 402 that directly or indirectly couples the following devices: memory 404, one or more processors 406, one or more presentation components 408, input/output (I/O) ports 410, I/O components 412, and power supply 414. Bus 402 represents what may be one or more busses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component such as a display device to be one of the I/O components 412. Also, processors, such as one or more processors 406, have memory. Distinction is not made between such categories as "workstation," "server," "laptop," "handheld device," etc., as all are contemplated within the scope of FIG. 4 and refer to "computer" or "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. Memory 404 may be removable, non-removable, or a combination thereof. Examples of memory include solid-state memory, hard drives, optical-disc drives, etc. Computing device 400 includes one or more processors 406 that read data from various entities such as bus 402, memory 404 or I/O components 412. One or more presentation components 408 present data indications to a person or other device. Examples of one or more presentation components 408 include a display device, speaker, printing component, vibrating component, etc. I/O ports 410 allow computing device 400 to be logically coupled to other devices, including I/O components 412, some of which may be built in computing device 400. Examples of I/O components 412 include a microphone, joystick, game pad, satellite dish, scanner, printer, wireless device, etc.

Radio 416 represents a radio that facilitates communication with a wireless telecommunication network. Illustrative wireless telecommunications technologies include CDMA, GPRS, TDMA, GSM, and the like. Radio 416 might additionally or alternatively facilitate other types of wireless communications including Wi-Fi, WiMAX, LTE, or other VoIP communications. As can be appreciated, in various aspects, radio 416 can be configured to support multiple technologies and/or multiple radios can be utilized to support multiple technologies. A wireless telecommunication network might include an array of devices, which are not shown so as to not obscure more relevant aspects of the invention. Components such as a base station, a communications tower, or even access points (as well as other components) can provide wireless connectivity in some aspects.

Many different arrangements of the various components depicted, as well as components not shown, are possible without departing from the scope of the claims below. Aspects of the technology have been described with the intent to be illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:
   determining that a physical location of a user device matches a physical location of a fixed wireless access point;
   identifying an uplink capacity of the user device;
   identifying an uplink capacity of the fixed wireless access point;
   determining whether to select one of the user device or the fixed wireless access point based on a comparison of the uplink capacity of the user device and the uplink capacity of the fixed wireless access point;
   in response to determining the fixed wireless access point is selected as having the uplink capacity that is greater than the uplink capacity of the user device, generating and communicating an instruction to the user device that causes the user device to directly connect to the fixed wireless access point; and in response to determining the user device is selected as having the uplink capacity that is greater than the uplink capacity of the fixed wireless access point:
  determining whether a signal power and a signal quality of the user device meet or exceed a predefined threshold;
  in response to determining the signal power and the signal quality of the user device are determined to meet or exceed the predefined threshold, generating and communicating an instruction to the user device that causes the user device to directly connect to a base station; and
  in response to determining the signal power and the signal quality of the user device are determined to be less than the predefined threshold, generating and communicating the instruction to the user device that causes the user device to directly connect to the fixed wireless access point.

2. The method of claim 1, wherein the instruction to the user device that causes the user device to directly connect to the base station comprises an instruction that automatically turns off Wi-Fi connectivity operations at the user device.

3. The method of claim 1, wherein the instruction to the user device that causes the user device to directly connect to the base station comprises an instruction that causes the user device to automatically switch from a Wi-Fi network to a direct wireless connection to the base station over a telecommunications network.

4. The method of claim 1, wherein the instruction to the user device that causes the user device to directly connect to the fixed wireless access point comprises one or more rules for connecting to a Wi-Fi network, the one or more rules being provided using an Access network discovery and selection function (ANDSF).

5. The method of claim 1, wherein the instruction to the user device that causes the user device to directly connect to the fixed wireless access point comprises one or more rules for connecting to a Wi-Fi network based on one or more currently running applications of the user device associated with decreased uplink resource usage.

6. The method of claim 1, wherein the instruction to the user device that causes the user device to directly connect to the base station comprises one or more rules for connecting to a telecommunications network based on one or more currently running applications of the user device associated with increased uplink resource usage.

7. The method of claim 1, wherein determining that the physical location of the user device is associated with the physical location of the fixed wireless access point further comprises one or more of:
  determining the physical location of the user device is within a coverage area of a Wi-Fi network provided by the fixed wireless access point; or
  determining the user device is connected to the Wi-Fi network provided by the fixed wireless access point.

8. The method of claim 1, wherein the predefined threshold defines a minimum value for Reference Signal Received Power (RSRP), Reference Signal Received Quality (RSRQ), or both.

9. One or more non-transitory computer-readable media storing instructions that when executed via one or more processors performs a computerized method, the media comprising: via one or more processors, without user intervention:
  determining that a physical location of a user device matches a physical location of a fixed wireless access point;
  identifying an uplink capacity of the user device;
  identifying an uplink capacity of the fixed wireless access point;
  determining whether to select one of the user device or the fixed wireless access point based on a comparison of the uplink capacity of the user device and the uplink capacity of the fixed wireless access point;
  in response to determining the fixed wireless access point is selected as having the uplink capacity that is greater than the uplink capacity of the user device, generating and communicating an instruction to the user device that causes the user device to directly connect to the fixed wireless access point; and
  in response to determining the user device is selected as having the uplink capacity that is greater than the uplink capacity of the fixed wireless access point:
    determining whether a signal power and a signal quality of the user device meet or exceed a predefined threshold;
    in response to determining the signal power and the signal quality of the user device are determined to meet or exceed the predefined threshold, generating and communicating an instruction to the user device that causes the user device to directly connect to a base station; and
    in response to determining the signal power and the signal quality of the user device are determined to be less than the predefined threshold, generating and communicating the instruction to the user device that causes the user device to directly connect to the fixed wireless access point.

10. The media of claim 9, wherein the instruction to the user device that causes the user device to directly connect to the base station comprises: an instruction that automatically turns off Wi-Fi connectivity operations at the user device, an instruction that causes the user device to automatically switch from a Wi-Fi network to a direct wireless connection to the base station over a telecommunications network, or both.

11. The media of claim 9, wherein the instruction to the user device that causes the user device to directly connect to the fixed wireless access point comprises one or more rules for connecting to a Wi-Fi network, the one or more rules being provided using an Access network discovery and selection function (ANDSF).

12. The media of claim 9, wherein the instruction to the user device that causes the user device to directly connect to the fixed wireless access point comprises one or more rules for connecting to a Wi-Fi network based on one or more currently running applications of the user device associated with decreased uplink resource usage.

13. The media of claim 9, wherein the instruction to the user device that causes the user device to directly connect to the base station comprises one or more rules for connecting to a telecommunications network based on one or more currently running applications of the user device associated with increased uplink resource usage.

14. The media of claim 9, wherein determining that the physical location of the user device is associated with the physical location of the fixed wireless access point further comprises one or more of:
  determining the physical location of the user device is within a coverage area of a Wi-Fi network provided by the fixed wireless access point; or
  determining the user device is connected to the Wi-Fi network provided by the fixed wireless access point.

15. A system comprising: a base station configured to:
determine that a physical location of a user device matches a physical location of a fixed wireless access point; identify an uplink capacity of the user device;
identify an uplink capacity of the fixed wireless access point;
determine whether to select one of the user device or the fixed wireless access point based on a comparison of the uplink capacity of the user device and the uplink capacity of the fixed wireless access point;
in response to determining the fixed wireless access point is selected as having the uplink capacity that is greater than the uplink capacity of the user device, generate and communicate an instruction to the user device that causes the user device to directly connect to the fixed wireless access point; and
in response to determining the user device is selected as having the uplink capacity that is greater than the uplink capacity of the fixed wireless access point:
  determine whether a signal power and a signal quality of the user device meet or exceed a predefined threshold;
  in response to determining the signal power and the signal quality of the user device are determined to meet or exceed the predefined threshold, generate and communicate an instruction to the user device that causes the user device to directly connect to the base station; and
  in response to determining the signal power and the signal quality of the user device are determined to be less than the predefined threshold, generate and communicate the instruction to the user device that causes the user device to directly connect to the fixed wireless access point.

16. The system of claim 15, wherein the instruction to the user device that causes the user device to directly connect to the base station comprises: an instruction that automatically turns off Wi-Fi connectivity operations at the user device, an instruction that causes the user device to automatically switch from a Wi-Fi network to a direct wireless connection to the base station over a telecommunications network, or both.

17. The system of claim 15, wherein the instruction to the user device that causes the user device to directly connect to the fixed wireless access point comprises one or more rules for connecting to a Wi-Fi network, the one or more rules being provided using an Access network discovery and selection function (ANDSF).

18. The system of claim 15, wherein the instruction to the user device that causes the user device to directly connect to the fixed wireless access point comprises one or more rules for connecting to a Wi-Fi network based on one or more currently running applications of the user device associated with decreased uplink resource usage.

19. The system of claim 15, wherein the instruction to the user device that causes the user device to directly connect to the base station comprises one or more rules for connecting to a telecommunications network based on one or more currently running applications of the user device associated with increased uplink resource usage.

20. The system of claim 15, wherein determining that the physical location of the user device is associated with the physical location of the fixed wireless access point further comprises one or more of:
  determining the physical location of the user device is within a coverage area of a Wi-Fi network provided by the fixed wireless access point; or
  determining the user device is connected to the Wi-Fi network provided by the fixed wireless access point.

* * * * *